United States Patent [19]

Graves

[11] 4,019,180
[45] Apr. 19, 1977

[54] REMOTE INFRARED SIGNAL COMMUNICATOR

[75] Inventor: Howard T. Graves, Alexandria, Va.

[73] Assignee: The United States of America as represented by the Secretary of the Army, Washington, D.C.

[22] Filed: Nov. 17, 1975

[21] Appl. No.: 632,594

Related U.S. Application Data

[63] Continuation of Ser. No. 304,710, Nov. 8, 1972, abandoned.

[52] U.S. Cl. .............................. 343/6 ND; 343/7.6; 343/18 E; 358/113; 343/6 A
[51] Int. Cl.² ...................... G01S 9/02; G01S 9/64
[58] Field of Search ................. 343/6 A, 6 ND, 7.6, 343/17.7, 18 E; 325/37; 178/DIG. 8, DIG. 38; 358/113

[56] References Cited

UNITED STATES PATENTS

| | | | |
|---|---|---|---|
| 2,359,032 | 9/1944 | Gott ........................... | 178/DIG. 38 |
| 3,104,478 | 9/1963 | Strauss et al. ............... | 343/6 ND X |
| 3,222,671 | 12/1965 | DeMatteo ..................... | 343/7 A X |
| 3,674,925 | 7/1972 | Heckman, Jr. ................ | 178/DIG. 8 |
| 3,715,497 | 2/1973 | Cooper et al. ................ | 178/DIG. 8 |
| 3,748,383 | 7/1973 | Grossman ..................... | 178/DIG. 8 |
| 3,830,970 | 8/1974 | Hurley et al. ................ | 178/DIG. 8 |

FOREIGN PATENTS OR APPLICATIONS

| | | | |
|---|---|---|---|
| 1,814,642 | 7/1969 | Germany ..................... | 178/DIG. 8 |

OTHER PUBLICATIONS

"Electronic Scanning System for Infrared Imaging" by M. E. Lasser et al., Proceedings of IRE, pp. 2069–2075, Dec., 1959.

*Primary Examiner*—Malcolm F. Hubler
*Attorney, Agent, or Firm*—Nathan Edelberg; Robert P. Gibson; John E. Holford

[57] ABSTRACT

An infrared viewer is provided which has a radio link to a remote monitoring station. Both on site and remote monitoring capabilities are provided at all times with minimum power requirements at the site, although the viewer may be intentionally located at inaccessible sites.

2 Claims, 4 Drawing Figures

REMOTE INFRARED SIGNAL COMMUNICATOR

The invention described herein may be manufactured, used, and licensed by or for the Government for governmental purposes without the payment to me (or us) of any royalty thereon.

This is a continuation of application Ser. No. 304,710, filed Nov. 8, 1972, the latter being now abandoned.

BACKGROUND OF THE INVENTION

In the field of surveillance a number of sensing systems have been under study. These include chemical, sonic, seismic, radar and infrared technique. Infrared systems have proved to be particularly effective with targets that have high temperatures relative to their backgrounds. This applies to most targets of concern to the military and to large number of civilian applications as well. The best discrimination is obtained in the spectral region above 3 microns wavelength known as far infrared.

A number of approaches have been explored with regard to surveillance devices using far infrared. The most promising real time device currently available is a detector diode. These are still very expensive, but can be used to provide two dimensional images over a limited number of devices. Typical of such devices is the AN/PAS hand held thermal viewer currently used by the military. The diodes in this viewer are arranged in a row and the image reflected off of a rotary vibrating mirror with an electrical drive circuit that also supplies a horizontal synchronizing signal. A Cathode Ray Tube (CRT) type of display is hard-wired into the unit so that the operator must remain relatively close to the viewer. When a number of viewers are in use at widely separated locations the information from each is relayed by voice radio and is subject to interpretation by the operator. In a combat situation, should the operator be forced to leave the site suddenly, the viewer might have to be destroyed, even though it were carefully concealed in an inaccessible location.

At such a time the unit could easily be providing the most significant type of surveillance information. The viewer itself being a passive device is difficult to locate, but the use of a long monitoring cable would increase the chances of its discovery. The use of an FM transmitter also involves a risk, but beam forming and frequency shift techniques are available for minimizing this risk and the unit by its function permits a further decrease in the risk.

SUMMARY OF INVENTION

The invention provides a two way transmission system for use between the viewer and a remote monitor. The system is designed so that the unit can be instantly shut down on command from the remote monitor with only a low drain receiver remaining on standby to resume operation on a subsequent command. An operator on site can override the command signal to operate the viewer with or without a transmitted signal. Properly situated one of these viewers can provide ample warning of the need to shutdown, and by employing a pulse-like quick-look operation the security at turn-on can also generally be preserved. Most effectively this would be coupled with information from other viewers on on-site observers.

BRIEF DESCRIPTION OF DRAWINGS

The invention is best understood with reference to the accompanying drawings wherein.

DESCRIPTION OF THE INVENTION

Figure 1:
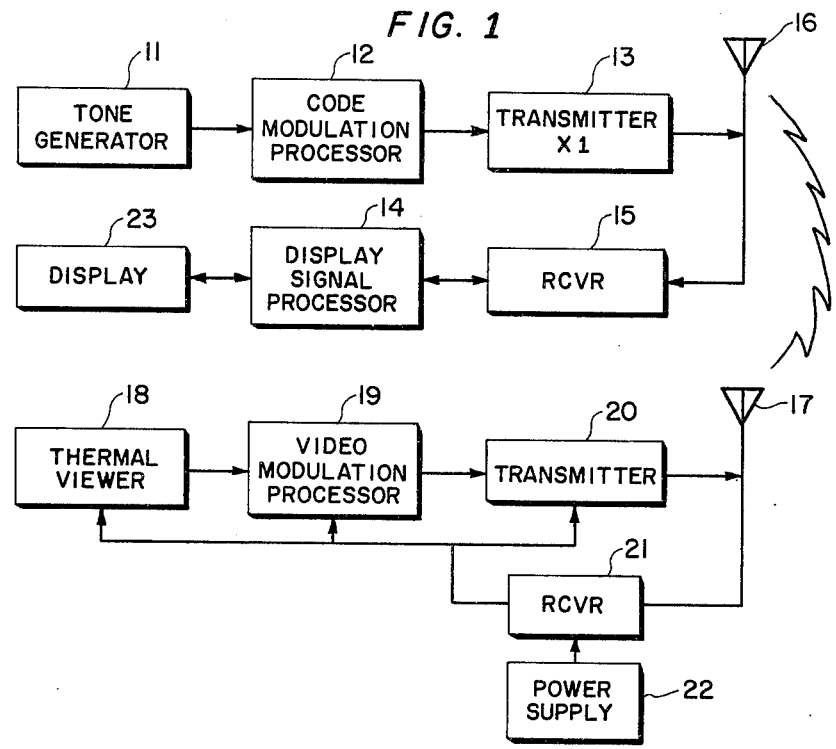
FIG. 1 shows a basic system employing a single viewer and remote monitor.

Referring to FIG. 1 more specifically there is shown a block diagram of a basic viewing system. To activate the system from a remote monitoring station the operator keys on a tone generator 11. The tone thus generated is fed to a code modulation processor which may simply amplify it to meet the modulation input requirements of the transmitter or transform it into prearranged coding sequences that will be recognized by the receiver 21 at the viewer. The modulation is impressed on a carrier in transmitter 13 and sent from antenna 16 at the remote monitor site to antenna 17 at the viewer site. Receiver 21 which idles at low power between broadcasts from transmitter 13 responds by activating a rachet type relay which connects the power supply 22 to the viewer circuits and retunes the receiver to accept the next transmission. Separate switches are provided so that an operator at the viewing site can connect or disconnect the viewer 18 and/or the viewing site transmitting equipment. These consist of a video modulation processor 19 which combines the video and synchronizing signals from the viewer and a transmitter 20 which supplys an FM modulated carrier to antennas 17 and 16.

Figure 2:
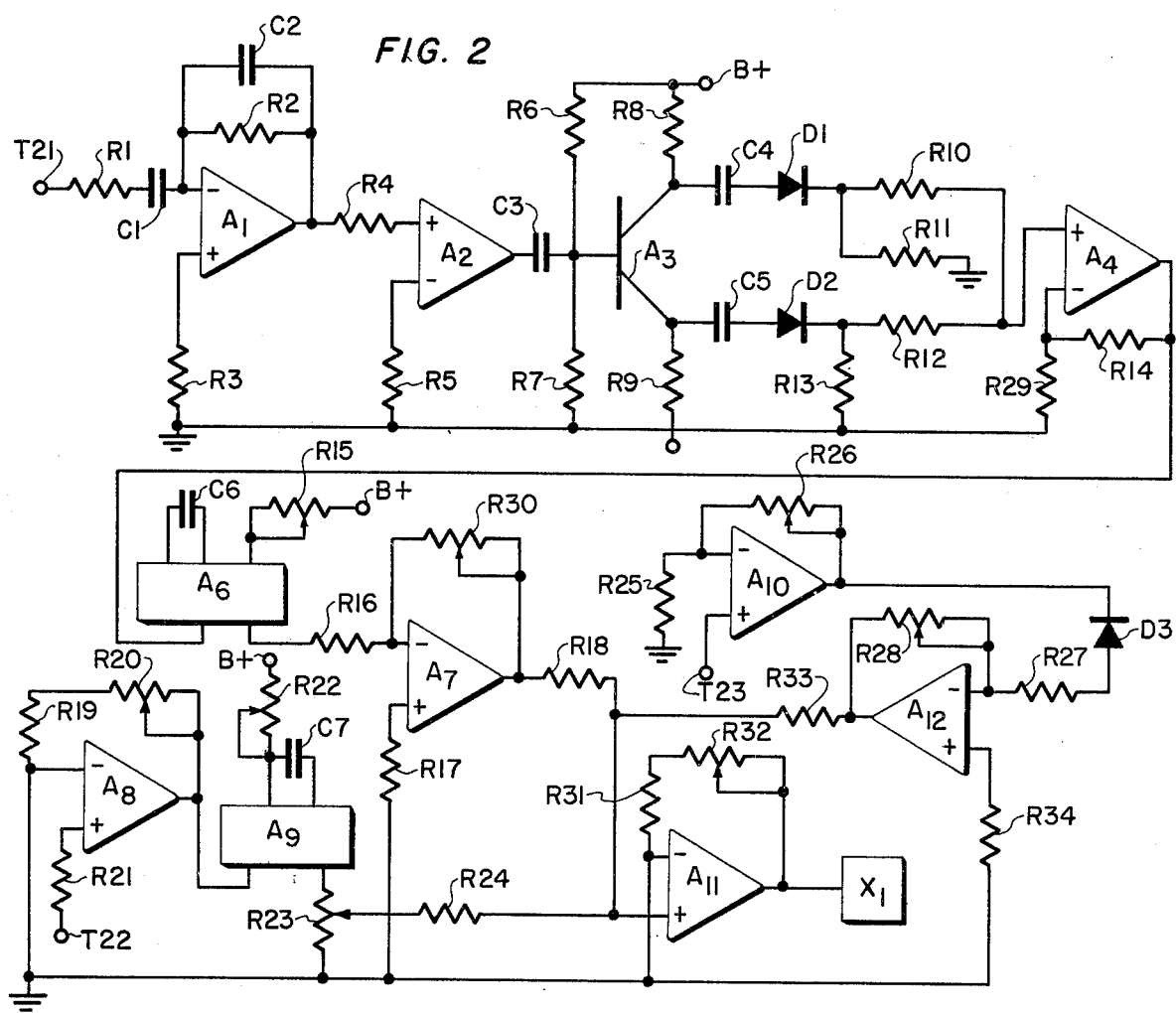
FIG. 2 shows the circuit diagram of the video modulation processor from FIG. 1.

Referring to FIG. 2 the circuitry of the video modulation processor 19 (FIG. 1) is shown. The AN/PAS-5 uses a triangular waveform to drive the horizontal scan and a sawtooth wave with a much shorter period to provide the vertical scan. The horizontal scan signal is applied to terminal $T_{21}$. Amplifier $A_1$ is connected as an integrator to provide a nearly square wave output. Amplifier $A_2$ is used a high gain clipper to improve the square wave shape. Paraphase amplifier $A_3$ produces two replicas of the square wave in antiphase relationship. Each is differentiated and only the resulting positive pulses are passed by diodes $D_1$ and $D_2$. These are amplified by $A_4$ and applied to the monostable multivibrator $A_6$ to provide 3 millisecond pulses. These are then inverted by $A_7$.

The vertical sawtooth wave is applied to terminal $T_{22}$. Amplifier $A_8$ saturates on the positive slope of the ramp and provides a negative spike from the steep negative slope. These are used to trigger the monostable multivibrator $A_9$ which provides pulses of 52 microseconds duration. The horizontal and vertical pulses are both applied to the noninverting input of $A_{11}$.

The video or intensity modulation signal from the viewer is applied to terminal $T_{23}$, the noninverting input of amplifier $A_{10}$, and after amplification to the inverting input of $A_{11}$. This puts the synchronizing pulses below the blanking level of the video signal as desired in this type of signal. The composite video and synchronizing signal is used to modulate the carrier from transmitter 13.

Figure 3:
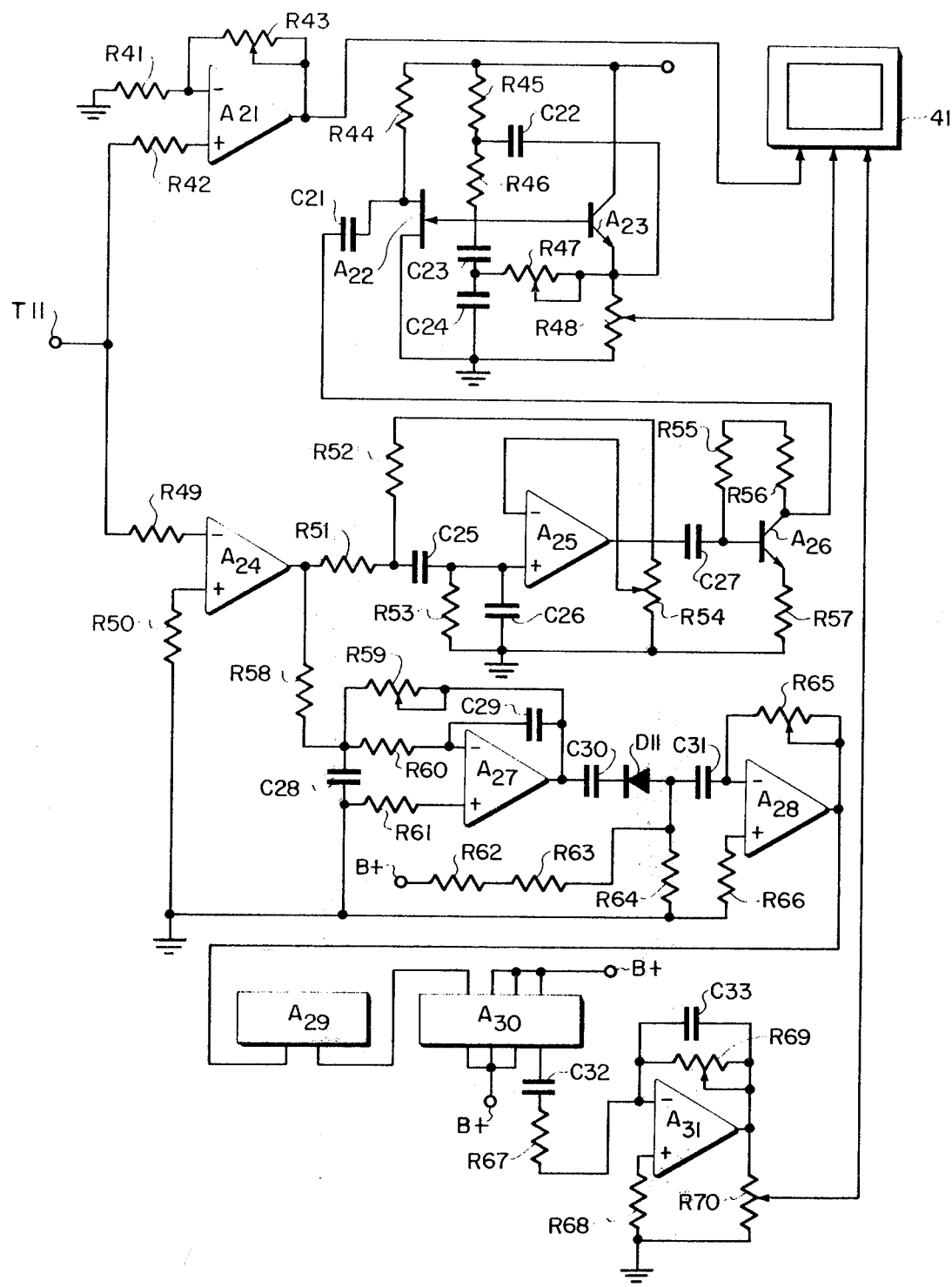
FIG. 3 shows the circuit diagram for the display signal processor shown in FIG. 1

FIG. 3 shows the circuit diagram of the display signal processor 14 (FIG. 1). The composite output of the modulation detector in receiver 15 is applied to terminal $T_{11}$. This signal is applied to the noninverting input of feedback amplifier $A_{21}$ which extracts and amplifies the video signal for the intensity modulation input Z of a CRT display 41. The composite signal is also applied to the inverting input of $A_{24}$ which amplifies all signals, the synchronizing pulses being positive and the video signals negative. Amplifier $A_{25}$ is provided with circuitry to form an active bandpass filter tuned to the frequency band of the vertical pulses. The resulting vertical output pulses are inverted by $A_{26}$ and used to synchronize a free running sawtooth oscillator formed from $A_{22}$ and $A_{23}$. The sawtooth drives the vertical Y input of the CRT display.

A second active low-pass filter is formed around $A_{27}$ and tuned to cover the frequency band of the horizontal synchronizing pulses. This circuit produces some differentiation of the signals resulting in undesirable positive spikes which are removed by the coupling diode $D_{11}$. Amplifier $A_{28}$ inverts these pulses which are then used to trigger the one shot multivibrator $A_{29}$ having a 0.03 millisecond period. These pulses in turn trigger a bistable flip-flop $A_{30}$ to produce square wave. Integrator $A_{31}$ recreates a triangular scan signal from the square wave input and this is used to drive the horizontal input X of the CRT display 4.

Figure 4:
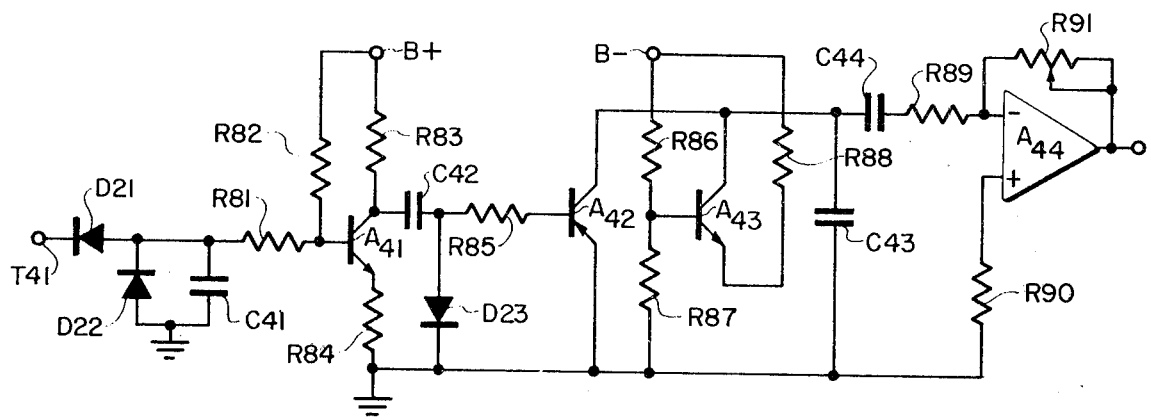
FIG. 4 shows an alternate embodiment of a portion of the circuit shown in FIG. 3.

FIG. 4 shows an alternative embodiment of the low-pass filter arrangement in FIG. 3. Terminal $T_{41}$ is connected directly to the output of amplifier $A_{24}$ in FIG. 3. Diodes $D_{21}$ and $D_{22}$ form a clipper-clamper circuit and most of the video signal is shunted to ground through capacitor $C_{41}$. The resulting positive signals are amplified and inverted by $A_{41}$ and clamped to ground by diode $D_{23}$. These signals turn on $A_{42}$ to discharge capacitor $C_{43}$.

TABLE I

| AMPLIFIERS | DIODES |
|---|---|
| $A_1$ - 741 Oper. Amp. | $D_1$ - 1N270 |
| $A_2$ - 741 Oper. Amp. | $D_2$ - 1N270 |
| $A_3$ - 2N222 (NPN Trans) | $D_3$ - 1N270 |
| $A_4$ - 741 Oper. Amp. | $D_{11}$ - 1N270 |
| $A_5$ - (Not Used) | $D_{21}$ - 1N270 |
| $A_6$ - SN74121 (Dig. Delay) | $D_{22}$ - 1N270 |
| $A_7$ - 741 Oper. Amp. | $D_{33}$ - 1N270 |
| $A_8$ - 741 Oper. Amp. | D MISC. |
| $A_9$ - SN74122 (Dig. Delay) | $X_1$ Comic CTM 402 |
| $A_{10}$ - 741 Oper. Amp. | $X_2$ - Comic CTM 402 |
| $A_{11}$ - 741 Oper. Amp. | $X_3$ - Comic ECVR |
| $A_{12}$ - 741 Oper. Amp. | $X_4$ - Car FM 201 |
| $A_{21}$ - 741 Oper. Amp. | RESISTORS-(Ohms) ½Watt(Unless Specif'd) |
| $A_{22}$ - 2N49 (FET) | $R_1$ - 6,000 |
| $A_{23}$ - 2N2222 (NPN Trans) | $R_2$ - 1,000,000 |
| $A_{24}$ - 741 Oper. Amp. | $R_3$ - 3,000 |
| $A_{25}$ - 741 Oper. Amp. | $R_4$ - 330 |
| $A_{26}$ - 2N2222 (NPN Trans) | $R_5$ - 1,000 |
| $A_{27}$ - 741 Oper. Amp. | $R_6$ - 330,000 |
| $A_{28}$ - 741 Oper. Amp. | $R_7$ - 330,000 |
| $A_{29}$ - SN54121 (Dig. Delay) | $R_8$ - 1,000 |
| $A_{30}$ - SN5472 (Flip-Flop) | $R_9$ - 560 |
| $A_{31}$ - 741 Oper. Amp. | $R_{10}$ - 1,000 |
| $A_{41}$ - 2N2222 (NPN Trans) | $R_{11}$ - 3,300 |
| $A_{42}$ - 2N3250 (PNP Trans) | $R_{12}$ - 1,000 |
| $A_{43}$ - 2N2222 (NPN Trans) | $R_{13}$ - 3,300 |
| $A_{44}$ - 741 Oper. Amp. | $R_{14}$ - 330,000 |
| | $R_{15}$ - 10,000 |
| $R_{16}$ - 2,200 | $R_{53}$ - 12,000 |
| $R_{17}$ - 2,200 | $R_{54}$ - 100,000 |
| $R_{18}$ - 2,700 | $R_{55}$ - 330,000 |
| $R_{19}$ - 75 | $R_{56}$ - 1,000 |
| $R_{20}$ - 50,000 | $R_{57}$ - 56 |
| $R_{21}$ - 1,000 | $R_{58}$ - 1,000 |
| $R_{22}$ - 20,000 | $R_{59}$ - 20,000 |
| $R_{23}$ - 10,000 | $R_{60}$ - 2,200 |
| $R_{24}$ - 2,700 | $R_{61}$ - 100,000 |
| $R_{25}$ - 1,000 | $R_{62}$ - 20,000 |
| $R_{26}$ - 10,000 | $R_{63}$ - 11,000 |
| $R_{27}$ - 5,000 | $R_{64}$ - 17,000 |
| $R_{28}$ - 10,000 | $R_{65}$ - 5,000 |
| $R_{29}$ - 5,000 | $R_{66}$ - 1,000 |
| $R_{30}$ - 100,000 | $R_{67}$ - 10,000 |
| $R_{31}$ - 100,000 | $R_{68}$ - 10,000 |
| $R_{32}$ - 100,000 | $R_{69}$ - 100,000 |
| $R_{41}$ - 1,000 | $R_{70}$ - 10,000 |
| $R_{42}$ - 1,000 | $R_{81}$ - 33,000 |
| $R_{43}$ - 20,000 | $R_{82}$ - 330,000 |
| $R_{44}$ - 5,000 | $R_{83}$ - 5,600 |
| $R_{45}$ - 10,000 | $R_{84}$ - |
| $R_{46}$ - 20,000 | $R_{85}$ - 33,000 |
| $R_{47}$ - 25,000 | $R_{86}$ - 600 |
| $R_{48}$ - 1,000 | $R_{87}$ - 2,200 |
| $R_{49}$ - 1,000 | $R_{88}$ - 100 |
| $R_{50}$ - 1,000 | $R_{89}$ - 5,700 |
| $R_{51}$ - 6,700 | $R_{90}$ - 3,000 |
| $R_{52}$ - 2,000 | $R_{91}$ - 10,000 |
| | CAPACITORS (MICROFARADS) 12 VOLTS |
| $C_1$ - .1 | |
| $C_2$ - .0068 | |
| $C_3$ - .027 | |
| $C_4$ - .056 | |
| $C_5$ - .056 | |
| $C_6$ - .1 | |

TABLE I-continued $C_7$ - .015
$C_8$ —
$C_{21}$ - .022
$C_{22}$ - 1
$C_{23}$ - .1
$C_{24}$ - .039
$C_{25}$ - .022
$C_{26}$ - .01
$C_{28}$ - .22
$C_{28}$ - 2.2
$C_{29}$ - .0068
$C_{30}$ - 1
$C_{31}$ - 10
$C_{32}$ - 1000
$C_{33}$ - 10
$C_{41}$ - .00820
$C_{42}$ - 1
$C_{43}$ - 1
$C_{44}$ - 1

Between discharges the capacitor is charged from the constant current source provided by $A_{43}$. Amplifier $A_{44}$ provides the same function as $A_{28}$ in FIG. 3. This circuit gives a cleaner better stabilized waveform than the circuitry of FIG. 3 with a significant improvement in picture quality at the monitor.

Further description of the components used in the preceding circuits is given in Table I. The B+ and B— voltages used were 5 volts and these were applied to the appropriate terminals of the 741 amplifiers. The digital integrated circuits were all 14 pin dual in-line types with pin 6 as the output terminal. At $A_6$ (FIG. 2) the input is to terminal 5, capacitor $C_6$ is connected to terminals 10 and 11, and resistor $R_{15}$ to terminal 9. At $A_9$ (same figure) the input is to terminal 1 and capacitor $C_7$ is connected to terminals 11 and 13 with $R_{22}$ at terminal 13. At $A_{29}$ the input is to terminal 5. Finally at $A_{30}$ the input is to terminal 12 while terminals 3, 4, 5, 9, 10 and 11 are all connected to B+. The use of integrated circuits and miniature transmitters permits the components to be housed in the existing cabinets of the AN/PAS-5 system. Alarm systems can be added in accordance with the disclosure in patent application Ser. No. 257,222 "Point Source Discriminator Thermal Alarm" by Howard T. Graves. Instead of a VHF-FM transmitter as described herein, amplitude modulation and carrier frequencies up to the laser spectrum can be employed, the latter probably adding a highly desirable security to the transmission by virtue of its narrow beam.

Obviously other modifications of the embodiments specifically described above will be apparent to those skilled in the art, but the invention is to be limited only by the claims which follow.

I claim:
1. A surveillance system comprising:
   a passive infrared viewer including at least one detector element supplying a video signal;
   a first wireless transmitter means for transmission of a first carrier wave;
   a first modulation circuit means coupling said viewer and said transmitter means for impressing the video image information from said detector means on the modulation envope of said first carrier wave;
   a power supply;
   a first receiver directly coupled to said power supply and tuned to a frequency band different from that of said first carrier wave to receive a second carrier wave and further including,
      a demodulator circuit means to generate a gating pulse in response to a preselected frequency shift in said second carrier, and
      a rachet type relay means activated by said gating pulse to connect and interrupt said power supply to said viewer, said first transmitter means and said first modulation means.
2. The combination according to claim 1 further including:
   a remote wireless transmitter and receiver means with a CRT type display, said remote receiver being tuned to receive said first carrier and to drive said CRT display in response to said modulation envelope; and
   a second manually operated modulation means coupled to said remote transmitter to produce said preselected frequency shift.

* * * * *